Patented Feb. 27, 1923.

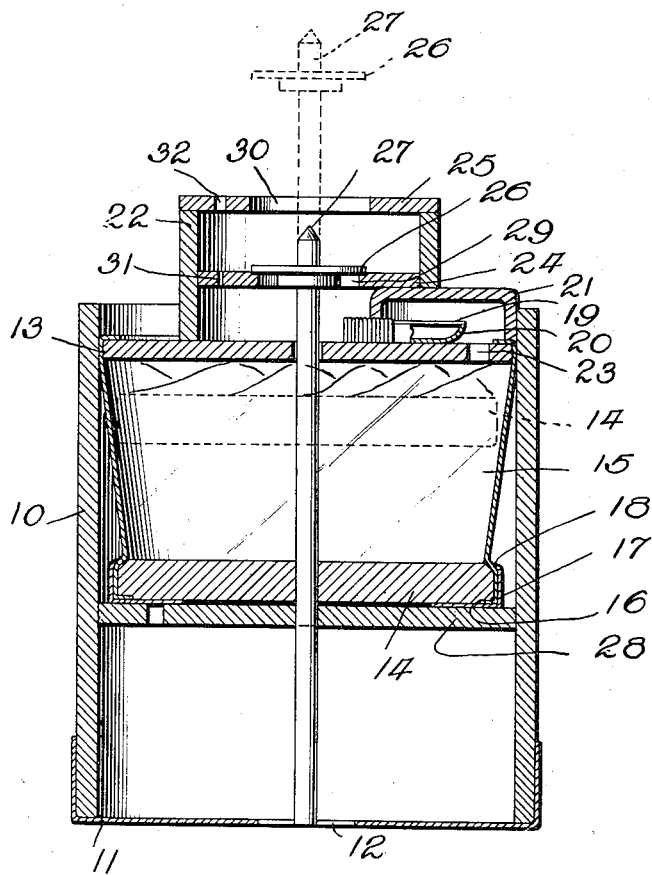

1,447,162

UNITED STATES PATENT OFFICE.

ARTHUR A. GERLING, OF NEW YORK, N. Y.

VOICING APPARATUS.

Original application filed November 8, 1922, Serial No. 599,698. Divided and this application filed January 19, 1923. Serial No. 613,707.

*To all whom it may concern:*

Be it known that I, ARTHUR A. GERLING, a citizen of the United States, residing at New York, in the county of New York and State of New York, have invented certain new and useful Improvements in Voicing Apparatus, of which the following is a specification.

The invention relates to a voicing apparatus which may be applied to toys which are known in the art as "talking toys" or the like.

An object of the invention is to provide a structure of this character which may be assembled more readily and economically than those heretofore known in the art; which is little likely to get out of order; and which is capable of producing louder sounds and more pronounced enunciation.

An illustrative embodiment of the invention is shown in the accompanying drawings, in which the figure is a central vertical section through the device.

As shown, the device comprises a cylinder 10 which is preferably formed of pasteboard, closed at one end by a cap 11 having a hole 12 in the bottom thereof to permit ready change of air content.

The remaining end of the cylinder 10 is shown as closed by means of a disk 13 set into the interior thereof a short distance from the end of the cylinder.

To provide a flow of air through the voicing apparatus a bellows is provided within the cylinder, shown as formed by means of a disk 14 having a cylinder 15 of flexible material secured to its edge and to the edge of the disk 13 prior to the insertion of the latter named disk into the cylinder. The disk 14 is intended to operate the bellows by means of gravity when the device is inverted from the position shown in the figure, and to facilitate its action is preferably made of some relatively heavy material, such as lead. To secure the cylinder 15 to the disk in a readily applied manner a disk or annular ring 16, preferably of metal, such as tin, having an upturned flange 17, the upper edges 18 of which are slightly inturned, or restricted may be pressed over the edge of the disk 14 with the walls of the cylinder 15 clamped therebetween. If desirable the material of the latter disk may be caused to flow in the act of applying the ring 16 so as to completely fill the space below the inturned edges 18.

To produce sound a reed 19 is shown as secured to the upper edge of a reed box 20 mounted upon the disk 13 adjacent one edge thereof, the reed box being enclosed by a chamber or sound box 21.

To contain the enunciating apparatus a cylinder 22 is shown as secured to the outside of the disk 13 concentric therewith, the end of the reed box 21 projecting to the interior of the last-named cylinder. The interior of the sound box 21 is in open communication with the interior of the bellows 15. An opening is provided through the disk 13 to the interior of the sound box 21, thereby providing for a free flow of air to and from the interior of the bellows 15 through the reed box.

The enunciating apparatus is shown as comprising a pair of rigid disks 24, 25, secured to the cylinder 22 in spaced relation. The disk 24 is shown as applied to the interior of the cylinder 22 adjacent the top of the sound box 21, and the disk 25 is desirably placed upon the end of the cylinder. The enunciating apparatus is completed by means of a disk 26 mounted upon a rod 27 slidable through and guided in openings in the disk 13 and in a disk 28 of rigid material secured to the interior of the cylinder 10 in spaced relation to the cap 11 thereof. The spacing of the disk 28 from the cap 11 is such that the rod 27 in the normally extended position of the bellows will not project beyond the cap 11 and in which the end of the rod 27 will not pass completely through said disk when the bellows is collapsed.

An opening 29 is provided in the disk 24 and an opening 30 in the disk 25, the openings being concentric with the disks, and the latter opening being the larger.

As the bellows is collapsed by gravity upon the inversion of the toy the air will be forced through the opening 23, through the reed 19, causing the same to emit a sound, through the opening 29, which opening at the initiation of the sound will be restricted by the presence of the disk 26 closely adjacent thereto and will escape through the opening 30. As the movement of the disk 26 proceeds this disk will obstruct the opening 30 and check the flow of air so as to cause the sound to be interrupted. The interruption of the sound being gradual and its repetition being gradually initiated as the disk passes through the opening will produce the sound of the letter "M."

To provide for a slight escape of air while the openings 29 and 30 are obstructed by the disk 26 air bleeds 31—32 are provided in the disks 24 and 25. The location of the disk 26 upon the rod 27 is such, as shown in the figure, that in its normal position the edges of the disk will seat upon the opening 29. The disk 26 may be made of any one of a variety of materials such as soft or hard rubber, fiber board, celluloid, felt, leather or the like.

In former devices of this character wherein rigid spaced disks on the rod 27 were forced through openings in flexible disks the opening of the disk was compelled to stretch to allow the rigid disk to pass through, which necessitated an exceedingly thin flexible disk and an accurate placing thereof upon the counter of its support. In the device of the present invention the disks 29—30 are preferably made of fiber board and may be very rapidly produced by means of machinery, and when so produced may be readily assembled with the cylinder 22.

This application is filed as a division of a co-pending application for patent on voicing apparatus: Serial Number 599,698, filed by myself November 8, 1922.

Minor changes may be made in the physical embodiment of the invention without departing from its spirit.

I claim:

1. A voicing apparatus comprising, in combination, a cylinder, a bellows in said cylinder, a member attached to a portion of said bellows, a sounding apparatus operable by air from said bellows, a chamber receiving air from said sounding apparatus, spaced members of rigid material each having an opening through which the air from said chamber passes, a disk normally closing one of said openings, said disk mounted upon said member and operable through the second opening to interrupt flow of air therethrough whereby to cause enunciation of sound from said apparatus.

2. A voicing apparatus comprising, in combination, a reed, means to force air past said reed to produce sound, a chamber having an opening in a wall thereof, said chamber receiving air passing said reed, a disk obstructing said opening, a chamber exterior of said first-named chamber and having an opening in a wall thereof, means to force said disk through said last-named opening, the graduated interruption of the flow of air through said chambers causing enunciation of the sound from said reed.

ARTHUR A. GERLING.